(12) United States Patent
Takahashi et al.

(10) Patent No.: US 6,253,738 B1
(45) Date of Patent: Jul. 3, 2001

(54) FUEL FEEDER

(75) Inventors: Koji Takahashi, Gunma; Takashi Hashimoto, Kanagawa, both of (JP)

(73) Assignee: Unisia Secs Corporation, Atsugi (JP)

( * ) Notice: Subject to any disclaimer, the term of this patent is extended or adjusted under 35 U.S.C. 154(b) by 0 days.

(21) Appl. No.: 09/411,239

(22) Filed: Oct. 4, 1999

(30) Foreign Application Priority Data

Oct. 15, 1998 (JP) .................................................. 10-309448

(51) Int. Cl.$^7$ .................................................. F02M 37/04
(52) U.S. Cl. .......................................... 123/509; 123/541
(58) Field of Search ................................... 123/509, 514, 123/510, 541; 137/572, 574, 576

(56) References Cited

U.S. PATENT DOCUMENTS

| | | | | |
|---|---|---|---|---|
| 4,928,657 | * | 5/1990 | Asselin | 123/514 |
| 5,038,741 | * | 8/1991 | Tuckey | 123/509 |
| 5,392,750 | * | 2/1995 | Laue et al. | 123/509 |
| 5,758,627 | * | 6/1998 | Minagawa et al. | 123/509 |
| 5,769,061 | * | 6/1998 | Nagata et al. | 123/509 |

FOREIGN PATENT DOCUMENTS

96/23967    8/1996   (WO) .

* cited by examiner

Primary Examiner—Carl S. Miller
(74) Attorney, Agent, or Firm—Foley & Lardner

(57) ABSTRACT

A fuel feeder comprises a filter case installed in a fuel tank through a fuel-tank access hole by means of a mounting bracket. An in-tank fuel pump and a filter element are both disposed in the filter case, while a fuel-pressure regulator having a fuel return port is mounted on the upper side of the filter case. Also provided is a fuel return pipe connected at its upstream end to the fuel return port of the pressure regulator, and having a conduit portion extending downwards from the upstream end along the outer periphery of the filter case. The fuel return pipe has a return-fuel outlet formed at a side of the conduit portion facing the outer periphery of the filter case, whereby superfluous fuel returned from the pressure regulator flows into the tank at a position spaced apart from the bottom of the tank with impingement of the superfluous fuel flow against the outer periphery of the filter case to reduce noises and to effectively release static electricity from the electrified filter case.

6 Claims, 6 Drawing Sheets

FUEL FEEDER

BACKGROUND OF THE INVENTION

1. Field of the Invention

The present invention relates to the improvements of a fuel feeder suitable to deliver fuel stored in a fuel tank of an automotive vehicle to an internal combustion engine.

2. Description of the Prior Art

Most cars commonly use an in-tank fuel feeder in which an in-tank fuel pump is located in the fuel tank to deliver the fuel discharged and pressurized from the pump to each individual fuel injector mounted on the engine. A pressure regulator is also connected to the discharge side of the fuel pump to maintain the correct fuel pressure to the injector. The in-tank fuel feeder generally includes a cylindrical fuel filter case which defining two spaces, namely a fuel-filter accommodating space between its inner and outer peripheries and a fuel pump accommodating space surrounded by the inner peripheral wall surface, a fuel pump provided in the pump accommodating space and discharging and delivering the fuel from the fuel tank to the fuel-filter accommodating space, a filter element provided in the fuel-filter accommodating space to remove dirt and other contaminants from the fuel discharged from the pump, and a pressure regulator installed at the bottom of the fuel filter case to regulate the fuel pressure in the fuel-filter accommodating space and having a fuel return port to return some of the fuel to the tank if the fuel pressure goes too high. One such in-tank fuel feeder has been disclosed in an international publication No. WO 96/23967. In the previously-described conventional in-tank fuel feeder, the fuel pump is installed in the pump accommodating space surrounded by the inner periphery of the fuel filter case, the filter element is installed in the fuel-filter accommodating space defined between the inner and outer peripheries of the filter case, and also the pressure regulator is arranged at the bottom of the filter case so that the return port opens to the downward direction. The upper end of the filter case is installed on the upper face of the fuel tank by means of a mounting bracket, whereas the lower end of the filter case vertically extends nearby the bottom of the fuel tank so that the lower end remains soaked in the fuel stored in the fuel tank. On the other hand, the upper fuel outlet port (fuel feed port) of the filter case is connected via a fuel feed line (a fuel feed pipe) to each individual fuel injector of the engine. As discussed above, in the conventional fuel feeder, the filter case extends vertically in a manner so as to hang down about the fuel-tank bottom wall. When the pump is working, the fuel in the tank is delivered from the fuel outlet port located at the upper end of the filter case via the fuel feed line to the injector, while fuel in excess of requirements passes out through the return port of the pressure regulator located at the bottom of the filter case and thence back to the tank. The arrangement of the return port of the pressure regulator of the conventional fuel feeder is insufficient from the viewpoint of noises and vibrations.

SUMMARY OF THE INVENTION

That is to say, in case that the return port of the pressure regulator is arranged to open to the downward direction near at the bottom of the fuel tank, there is an increased tendency for the superfluous fuel flowing out of the return port to be brought into collision-contact with the bottom wall of the tank. Additionally, the fuel pump is designed so that the pump can always discharge or deliver more fuel than the fuel injectors of the engine need. During engine operation, fuel in excess of requirements continually returns through the pressure regulator to the tank and thus continues to impinge against the bottom wall of the tank. Owing to the impingement of the superfluous fuel flow against the bottom wall of the tank, undesired noises and vibrations take place during the engine operation. This reduces comfortability of the automotive vehicle and results in degradation in quality of the fuel feeder.

Accordingly, it is an object of the invention to provide a fuel feeder for automotive vehicles which avoids the aforementioned disadvantages of the prior art.

It is another object of the invention to provide an in-tank fuel feeder which is capable of reducing noises and vibrations occurring owing to superfluous fuel flow returned through a pressure regulator to a fuel tank to the minimum when an in-tank fuel pump is working, thus enhancing both comfortability and quality.

In order to accomplish the aforementioned and other objects of the present invention, a fuel feeder comprises a filter case including an inner tubular portion and an outer tubular portion, defining a fuel-filter accommodating space between an outer peripheral wall of the inner tubular portion and an inner peripheral wall of the outer tubular portion, and defining a fuel pump accommodating space in an inner peripheral wall of the inner tubular portion, an in-tank fuel pump adapted to be located in a fuel tank by accommodating the in-tank fuel pump in the pump accommodating space of the filter case, and discharging fuel in the fuel tank into the fuel-filter accommodating space, a filter element accommodated in the fuel-filter accommodating space to remove dirt and other contaminants from the fuel discharged from the in-tank fuel pump and passing through the filter element, a pressure regulator installed on the filter case and having a fuel return port to return superfluous fuel to the fuel tank if a fuel pressure in the fuel-filter accommodating space exceeds a predetermined pressure level, the pressure regulator located at an upper side of the filter case, and a fuel return pipe connected at one end to the fuel return port of the pressure regulator and having a conduit portion extending downwards from the one end along the outer peripheral wall of the outer tubular portion of the filter case.

According to another aspect of the invention, a fuel feeder comprises a filter case including an inner tubular portion and an outer tubular portion, defining a fuel-filter accommodating space between an outer peripheral wall of the inner tubular portion and an inner peripheral wall of the outer tubular portion, and defining a fuel pump accommodating space in an inner peripheral wall of the inner tubular portion, an in-tank fuel pump adapted to be located in a fuel tank by accommodating the in-tank fuel pump in the pump accommodating space of the filter case, and discharging fuel in the fuel tank into the fuel-filter accommodating space, a filter element accommodated in the fuel-filter accommodating space to remove dirt and other contaminants from the fuel discharged from the in-tank fuel pump and passing through the filter element, a pressure regulator installed on the filter case and having a fuel return port to return superfluous fuel to the fuel tank if a fuel pressure in the fuel-filter accommodating space exceeds a predetermined pressure level, the pressure regulator located at an upper side of the filter case, and a fuel return pipe connected to the fuel return port of the pressure regulator for returning the superfluous fuel to the fuel tank, the fuel return pipe comprising a fitted portion which is fitted onto a downstream end of the fuel return port of the pressure regulator, a conduit portion extending downwards from the fitted portion along the outer peripheral wall of the outer tubular portion of the filter case, a return-fuel outlet formed in a side of the conduit portion facing the outer peripheral wall of the outer tubular portion of the filter case and located at a position upwardly spaced apart from a bottom portion of the fuel-tank, and a curved wall surface portion formed in a lowermost end of the conduit portion so that the curved wall surface is curved in a direction of the outer peripheral wall of the outer tubular portion of the filter case and formed into a substantially concave, spherical surface, whereby the curved wall surface cooperates with the return-fuel outlet so that superfluous fuel flow is directed toward the outer peripheral wall of the outer tubular portion of the filter case to cause impingement of the superfluous fuel flow against the outer peripheral wall of the outer tubular portion of the filter case.

According to a further aspect of the invention, a fuel feeder comprises a filter case comprising first, second, and third filter case elements integrally connected to each other, the first filter case element forming a main body of the filter case and including an inner tubular portion and an outer tubular portion, defining a fuel-filter accommodating space between an outer peripheral wall of the inner tubular portion and an inner peripheral wall of the outer tubular portion, and defining a fuel pump accommodating space in an inner peripheral wall of the inner tubular portion, the second filter case element including a mounting bracket having a flat-plate portion located in a fuel-tank access hole and detachable from the first filter case element, and the third filter case element including a pump supporting bracket having a bottom portion covering a bottom opening of the filter case and side wall portions fitted onto the outer peripheral wall of the outer tubular portion of the first filter case element and detachable from the first filter case element, and the pump supporting bracket having a mounting hole, an in-tank fuel pump adapted to be located in a fuel tank by accommodating the in-tank fuel pump in the pump accommodating space of the first filter case element, and discharging fuel in the fuel tank into the fuel-filter accommodating space, a filter element accommodated in the fuel-filter accommodating space to remove dirt and other contaminants from the fuel discharged from the in-tank fuel pump and passing through the filter element, a pressure regulator installed on the first filter case element and having a fuel return port to return superfluous fuel to the fuel tank if a fuel pressure in the fuel-filter accommodating space exceeds a predetermined pressure level, the pressure regulator located at an upper side of the first filter case element, and a fuel return pipe connected to the fuel return port of the pressure regulator for returning the superfluous fuel to the fuel tank, the fuel return pipe comprising a fitted portion which is fitted onto a downstream end of the fuel return port of the pressure regulator, a conduit portion extending downwards from the fitted portion along the outer peripheral wall of the outer tubular portion of the first filter case element, a return-fuel outlet formed in a side of the conduit portion facing the outer peripheral wall of the outer tubular portion of the first filter case element and located at a position upwardly spaced apart from a bottom portion of the fuel tank, a curved wall surface portion formed in a lowermost end of the conduit portion so that the curved wall surface is curved in a direction of the outer peripheral wall of the outer tubular portion of the first filter case element and formed into a substantially concave, spherical surface, whereby the curved wall surface cooperates with the return-fuel outlet so that superfluous fuel flow is directed toward the outer peripheral wall of the outer tubular portion of the first filter case element to cause impingement of the superfluous fuel flow against the outer peripheral wall of the outer tubular portion of the first filter case element, and a bar-like mounting portion extending downwards from the lowermost end of the conduit portion and having a tip end portion which is fitted into the mounting hole of the pump supporting bracket.

DESCRIPTION OF THE PREFERRED EMBODIMENTS

Figure 1:
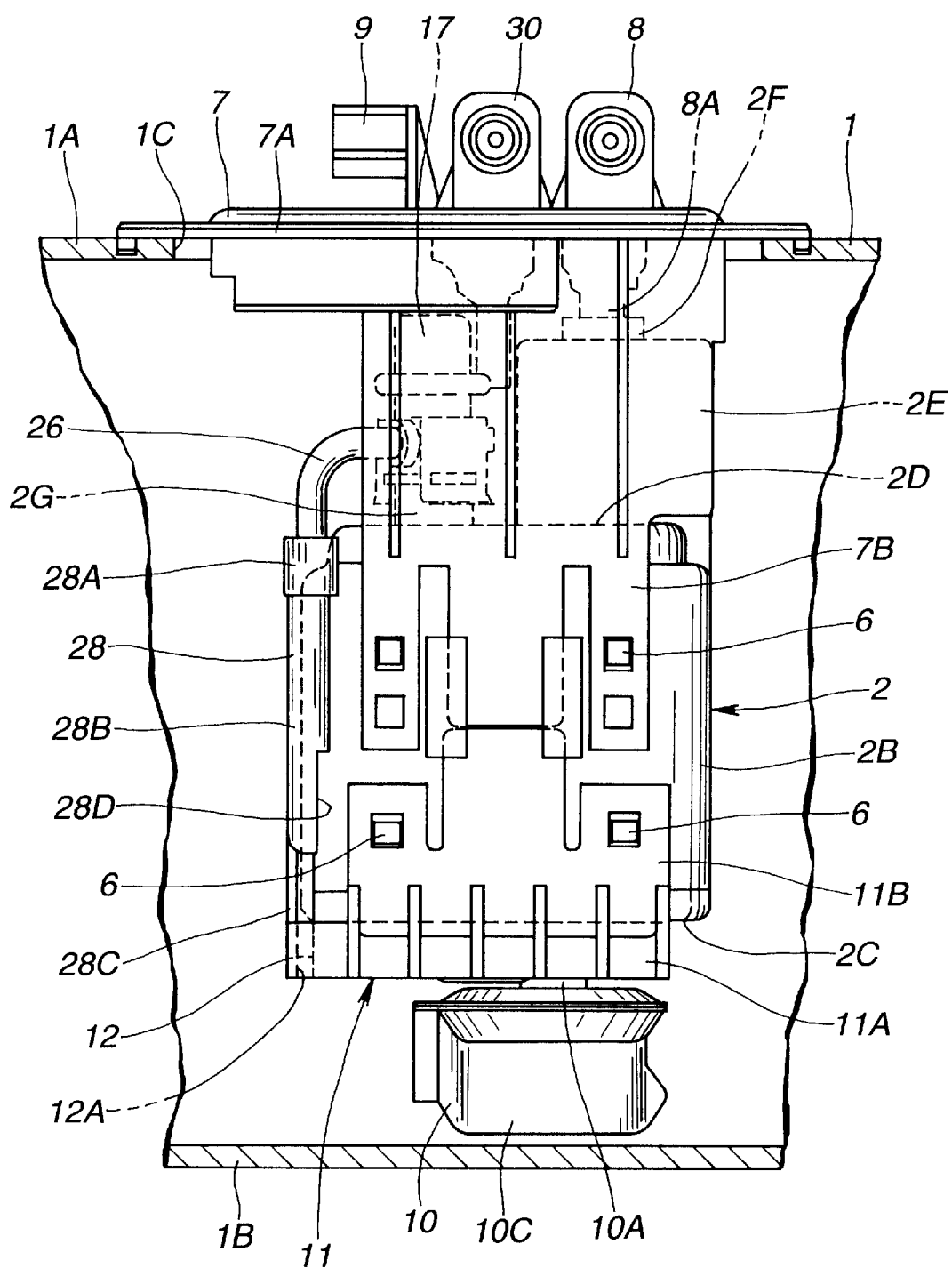
FIG. 1 is a front elevation illustrating one embodiment of a fuel feeder in an assembled state where the fuel feeder is installed on the fuel tank.
Figure 2:
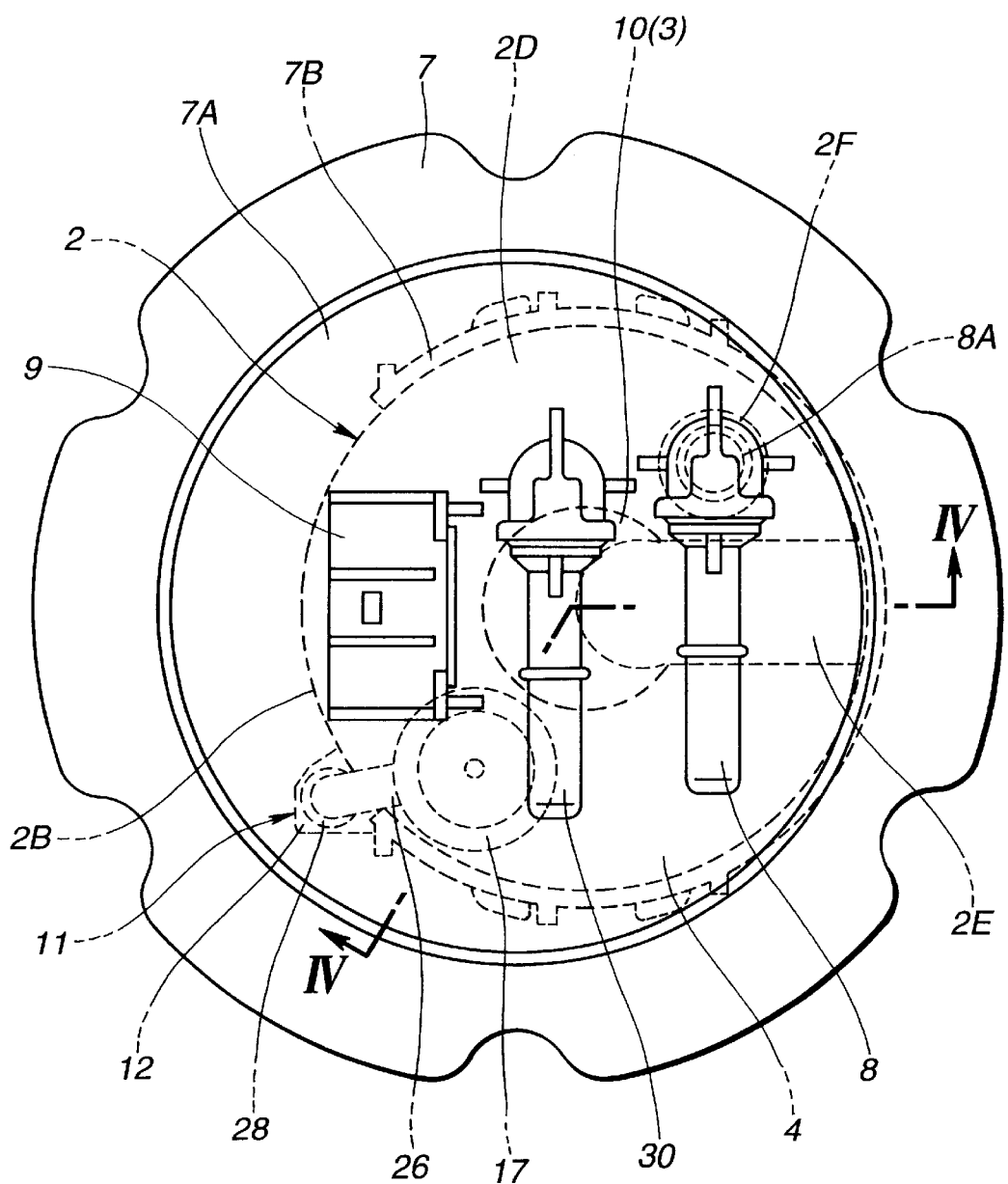
FIG. 2 is a plan view illustrating the fuel feeder of the embodiment shown in FIG. 1.
Figure 3:
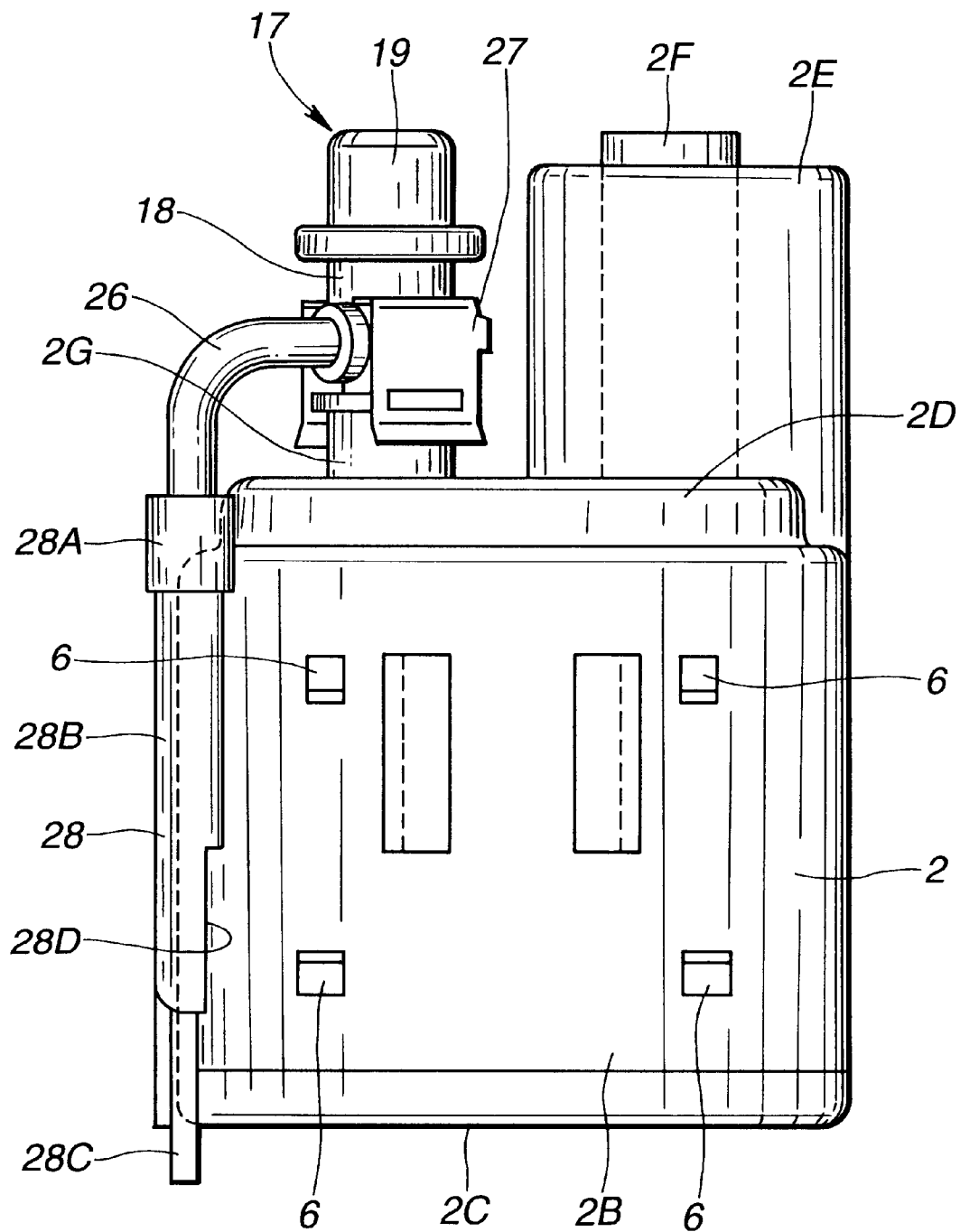
FIG. 3 is a front elevation illustrating a filter case constructing part of the fuel feeder in a disassembled state where the filter case is removed from its mounting bracket.
Figure 4:
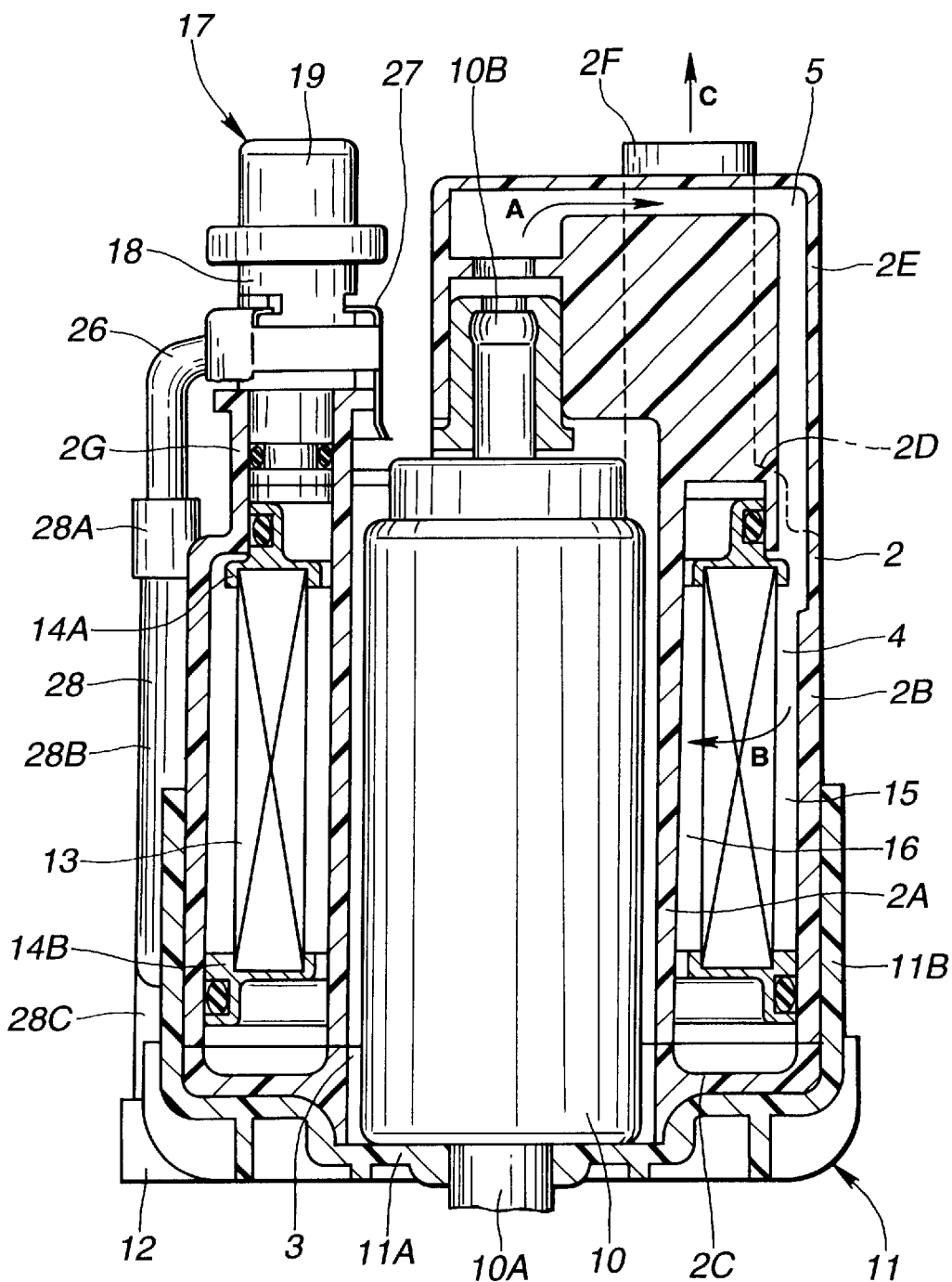
FIG. 4 is a longitudinal cross-section of the filter case, taken along the line IV—IV of FIG. 2.
Figure 5:
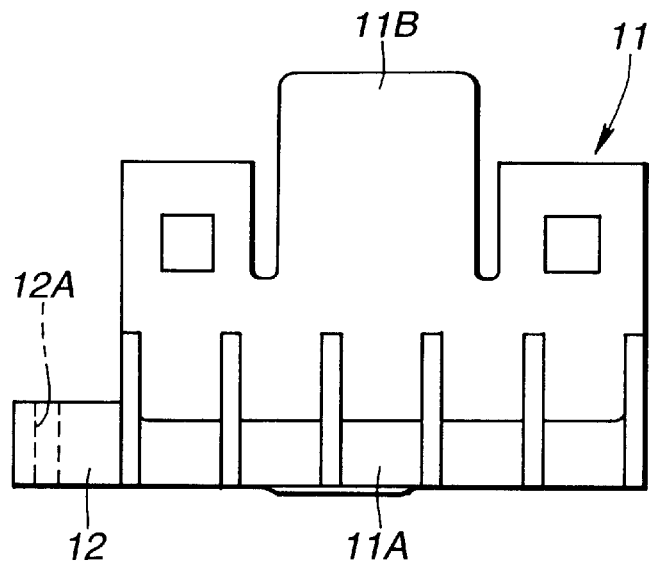
FIG. 5 is a front elevation illustrating a pump supporting bracket for the fuel pump.
Figure 6:
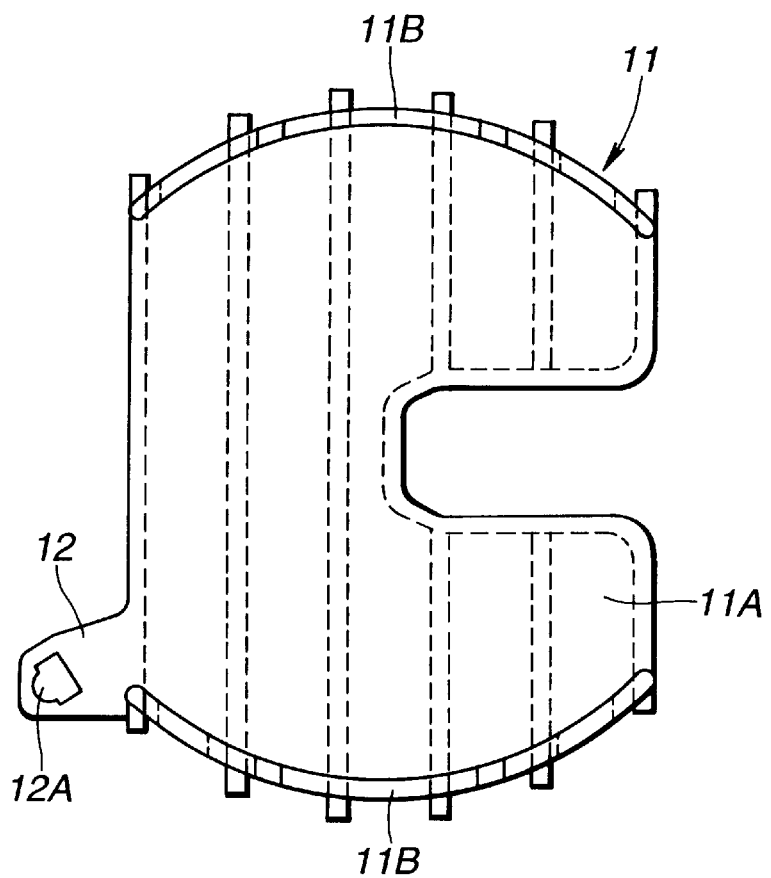
FIG. 6 is a plan view illustrating the pump supporting bracket shown in FIG. 5.
Figure 7:
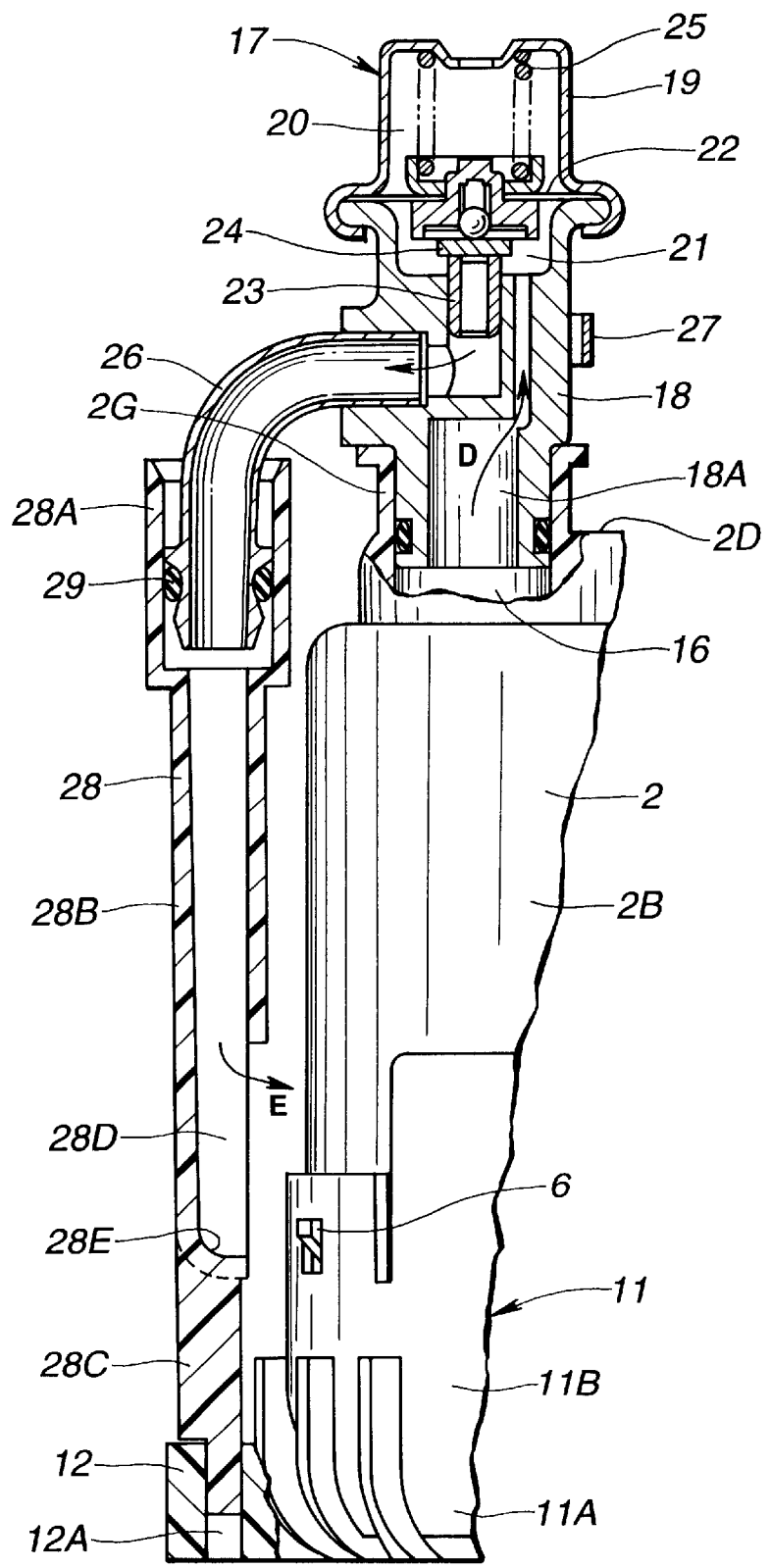
FIG. 7 is a partly-enlarged cross-sectional view illustrating a pressure regulator and a return pipe installed on the filter case.

Referring now to the drawings, particularly to FIG. 1, the fuel feeder of the invention is exemplified in an automobile engine with a fuel system including a fuel tank and an in-tank fuel pump. In FIG. 1, reference sign 1 denotes a shallow fuel tank serving as a storage tank for fuel on an automotive vehicle. The fuel tank 1 is often made of a resin material. The fuel tank 1 includes a top portion 1A and a bottom portion 1B. The top portion 1A of the tank is formed with a mounting hole 1C for a mounting bracket 7 (see FIG. 2) which will fully described later. In FIG. 1, reference sign 2 denotes a fuel filter case made of a resin material and formed into a double cylindrical structure. As best seen in FIGS. 2 and 4, the filter case 2 is comprised of an inner cylindrical portion (an inner tubular portion) 2A, an outer cylindrical portion (an outer tubular portion) 2B radially spaced from the inner cylindrical portion 2A in such a manner to surround the outer periphery of the inner cylindrical portion 2A, an annular bottom wall portion 2C interconnecting the inner and outer cylindrical portions 2A and 2B at the bottom end, an upper lid portion 2D interconnecting the inner and outer cylindrical portions 2A and 2B at the upper end, a substantially square fuel passage portion 2E projected upwards from the upper lid portion 2D and formed therein with a fuel passage 5 (described later), a fuel outflow pipe portion 2F extending upwards from the upper lid portion 2D and communicating at its downstream end or innermost end with an outflow chamber 16 (described later), and a substantially cylindrical pressure-regulator fitting 2G extending upwards from the upper lid portion 2D and communicating at its innermost end with the outflow chamber 16 defined in the filter case 2. As can be appreciated from FIGS. 2 and 4, the internal space surrounded by the inner peripheral wall of the inner cylindrical portion 2A functions as a fuel pump accommodating space 3 for an in-tank electric fuel pump 10 (described later). Also, an annular fuel-filter accommodating space 4 is defined between the inner and outer cylindrical portions 2A and 2B. As best seen in FIG. 4, the substantially square fuel passage portion 2E is formed therein with the substantially inverted-L shaped fuel passage 5 which intercommunicate an outlet port 10B of the in-tank fuel pump 10 and the inflow chamber 15 defined in the filter case 2. As clearly shown in FIGS. 1, 3 and 7, the filter case 2 is formed on its outer periphery with a plurality of claw-like snap portions 6. As shown in FIGS. 1 and 2, reference sign 7 denotes the mounting bracket made of a resin material and being integrally connected to the filter case 2 when assembling. The mounting bracket 7 is comprised of a flat-plate portion 7A located in the mounting hole (that is, the fuel-tank access hole) 1C of the tank top portion 1A, and a circular-arc shaped, cylindrical portion 7B formed with a plurality of square holes into which the upper half the plurality of claw-like snap portions 6, that is, the upper claw-like snap portions are detachably fitted. The mounting bracket 7 is provided for stably holding the filter case 2 within the fuel tank 1, so that the lower end of the filter case 2 remains soaked in the fuel stored in the tank 1, and so that the filter case 2 extends vertically and hangs down about the tank bottom wall. The flat-plate portion 7A is formed on its upper face with a substantially inverted-L shaped fuel-feed outlet 8 and an electrical connector 9 needed to electrically drive the fuel pump 10. The lower portion of the inverted-L shaped fuel-feed outlet 8 serves as a downwardly-extending connection pipe portion 8A which is connected to the fuel outflow pipe portion 2F of the filter case 2. As best seen in FIG. 4, the in-tank fuel pump 10 is installed in the pump accommodating space 3 defined in the filter case 2. There are several types of fuel pump, for example an in-tank, turbine-type electric fuel pump, an in-tank, toroidal-type electric fuel pump, or the like. The fuel pump 10 has the fuel inlet port (or the fuel inlet pipe portion) 10A through which the fuel is drawn or sucked from the tank 1 into the pump, and the fuel outlet port (or the fuel outlet pipe portion) 10B through which the fuel is discharged via the substantially inverted-L shaped fuel passage 5 into the inflow chamber 15 of the filter case 2. As shown in FIG. 1, an in-tank fuel filter 10C is connected to the inlet port 10A to prevent dirt from entering the fuel pump 10. As best seen in FIG. 4, reference sign 11 denotes a pump supporting bracket integrally fitted or connected to the bottom of the filter case 2. As seen in FIGS. 4 through 7, the pump supporting bracket 11 is comprised of a substantially circular bottom portion 11A covering the underside of the pump 10, and two side wall portions (11B, 11B) respectively upwardly perpendicularly extending from the two opposing circular-arc shaped edge portions of the bottom portion 11A and having a plurality of square holes into which the lower half the plurality of claw-like snap portions 6, that is, the lower claw-like portions are detachably fitted. With the side wall portions (11B, 11B) engaged with the lower claw-like snap portions 6 and fitted onto the outer periphery of the filter case 2 by virtue of the snapping action of the pump supporting bracket 11 to the lower claw-like snap portions 6 of the filter case 2, the pump assembly is reliably certainly held in place. As seen in FIG. 6, the bottom portion 11B of the pump supporting bracket 11 is formed with a return-pipe supporting hole portion 12 radially outwardly projected from the outer periphery of the bottom portion 11B. The return-pipe supporting hole portion 12 has a substantially square, non-circular return-pipe mounting hole 12A. Returning to FIG. 4, reference sign 13 denotes an annular filter element accommodated in the fuel-filter accommodating space 4 defined in the inner and outer cylindrical portions 2A and 2B of the filter case 2. As seen in FIG. 4, the filter element 13 is installed in the filter case 2 in a fluid-tight fashion by means of upper and lower filter-element supporting brackets 14A and 14B, and whereby the filter accommodating space 4 is divided into the inflow chamber 15 and the outflow chamber 16. The filter element 13 permits the fuel discharged from the pump outlet port 10B to flow from the inflow chamber 15 to the outflow chamber 16 therethrough, while removing dirt and other contaminants from the fuel for fuel purification. As shown in FIGS. 1, 2, 3, 4 and 7, reference sign 17 denotes the fuel-pressure regulator. The pressure regulator 17 is located at the upper side of the filter case 2. As best seen in FIGS. 4 and 7, the pressure regulator 17 is comprised of a bottom case 18 having a fuel inflow port 18A, an upper case 19 fixedly connected to the upper end of the bottom case 18, a flexible diaphragm 22 sandwiched between the upper case 19 and the bottom case 18 and dividing the interior space within the upper case 19 and the bottom case 18 into a pressure control chamber 20 and a fuel chamber 21, an outlet valve 24 fitted to the central portion of the diaphragm 22 through an armature or the like and seated on a cylindrical hollow valve seat 23 attached to the bottom case 18, a diaphragm spring 25 disposed in the pressure control chamber 20 to adjust a set pressure of the pressure regulator 17, and a curved fuel-return, outlet fitting portion (or a curved fuel return port) 26. As best seen in FIGS. 4 and 7, the bottom case 18 is firmly connected at its lower end to the pressure-regulator fitting 2G of the filter case 2 by virtue of a holder 27, in such a manner that the fuel inflow port 18A of the bottom case 18 communicates with the outflow chamber 16 of the filter case 2. When the fuel pressure within the filter case 2 (i.e., the fuel pressure in the fuel-filter accommodating space 4) exceeds a predetermined pressure level based on the set pressure of the diaphragm spring 25, the diaphragm 22 moves upwards (in a direction of the pressure control chamber 20) from its initial position against spring bias of the diaphragm spring 25. As a result, the valve 24 opens and the superfluous fuel is relieved from the filter case 2 through the inflow port 18A of the pressure regulator 17, the fuel chamber 21, and the outlet fitting portion 26 into the fuel tank. In this manner, the pressure regulator 17 regulates the fuel pressure in the outflow chamber 16 of the filter case 2 to the predetermined pressure level so as to maintain the pressure of fuel delivered through the fuel-feed outlet 8 at a predetermined constant value. In FIG. 7, reference sign 28 denotes a fuel return pipe connected at its one end to the outlet fitting portion 26 of the fuel-pressure regulator 17 at its one end in a fluid-tight fashion. Actually, the return pipe 28 includes a cylindrical fitted portion 28A which is fitted onto the downstream end of the outlet fitting portion (or the pressure-regulator fuel return port) 26 in a fluid-tight fashion via a seal ring 29 such as an O ring, a conduit portion 28B extending downwards from the cylindrical fitted portion 28A along the outer periphery of the filter case 2 and arranged substantially in parallel with the outer peripheral wall surface of the outer cylindrical portion 2B of the filter case 2, and a bar-like mounting portion 28C extending downwards from the lowermost end of the conduit portion 28B and having a stepped tip end which is fitted into the return-pipe mounting hole 12A of the return-pipe supporting hole portion 12 of the pump supporting bracket 11. The stepped tip end of the bar-like mounting portion 28C is correspondingly shaped with respect to the non-circular lateral cross section of the return-pipe mounting hole 12A (see FIG. 6), thereby preventing relative rotation of the bar-like mounting portion 28C within the return-pipe mounting hole 12A. A part of the downstream side of the conduit portion 28B is formed with a return-fuel outlet 28D located at a position upwardly spaced apart from the bottom portion 1B of the fuel tank 1. That is, the return pipe 28 has the return-fuel outlet 28D formed in a side of the conduit portion 28B facing the outer peripheral wall of the outer cylindrical portion 2B of the filter case 2. In the shown embodiment, the return-fuel outlet 28D is formed as an elongated slot extending vertically (or in the longitudinal direction of the conduit portion 28B) between the middle and the downstream end of the conduit portion 28B and facing the outer periphery of the filter case 2. The conduit portion 28B is formed in its lowermost end with a curved wall surface portion 28E inwardly curved in a direction of the outer periphery of the filter case 2 and formed into a substantially concave, spherical surface. The installation position of the pressure regulator 17 and the unique arrangement of the fuel return pipe 28 permit the superfluous fuel flowing through the conduit portion 28B to be guided by the curved wall surface portion 28E and to be smoothly routed toward the outer periphery of the filter case 2 via the return-fuel outlet 28D. As may be appreciated from the above, the return pipe 28 functions to return the superfluous fuel from the outlet fitting portion 26 of the pressure regulator 17 via the return-fuel outlet 28D to the tank 1, while impinging almost all of the fuel returned upon the outer periphery of the filter case 2. Returning to FIGS. 1 and 2, reference sign 30 denotes a fuel-return passage which is formed on the mounting bracket 7 and is used only in a so-called full-return type fuel supply system wherein superfluous fuel is returned via a pressure regulator (not shown) provided at the downstream side of the fuel injectors (not shown) of the engine.

Hereunder described in detail Is the operation of the fuel feeder of the embodiment.

As shown in FIG. 4, during operation of the in-tank fuel pump 10, the fuel in the tank 1 is pressurized and discharged from the outlet port 10B, and then flows into the fuel passage 5 of the substantially square fuel passage portion 2E (see the arrow A of FIG. 4), and then flowing from the inflow chamber 15 to the outflow chamber 16 while being passed through the filter element 13 for filtration (see the arrow B of FIG. 4). Thereafter, as indicated by the arrow C of FIG. 4, the pressurized and purified fuel is delivered through the fuel outflow pipe portion 2F of the filter case 2 via the fuel-feed outlet 8 of the mounting bracket 7 to the fuel injectors. On the other hand, as indicated by the arrow D of FIG. 7, part of the fuel flowing through the outflow chamber 16 flows into the fuel chamber 21 of the pressure regulator 17 via the pressure-regulator fitting 2G of the filter case 2. When the pressure in fuel introduced into the fuel chamber 21 becomes above the predetermined pressure level (i.e., the set pressure of the diaphragm spring 25 of the pressure regulator 17), the valve 24 begins to open. Thus, the superfluous fuel in the filter case 2 is returned through the outlet fitting portion 26 and the return pipe 28 to the tank 1, with impingement of the superfluous fuel returned against the outer periphery of the filter case 2 at some distance from the bottom portion 1B of the tank 1. Assuming that adequate fuel is stored in the tank 1, the return-fuel outlet 28D of the return pipe 28 remains soaked in the fuel stored in the tank. In this case, the fuel returned through the return pipe 28 flows out of the return-fuel outlet 28D directly into the fuel in the tank 1. In contrast to the above, when the fuel stored in the tank 1 is reduced to a slight amount and thus the lower end of the filter case 2 becomes out of contact with the fuel in the tank 1, the superfluous fuel flowing out through the return-fuel outlet 28D is blown against the outer periphery of the filter case 2. As a result, the superfluous fuel is returned to the fuel tank 1, while coming into collision-contact with the outer periphery of the filter case 2. As is generally known, the fuel in the tank 1 usually contains a very small amount of or infinitesimal conductive impurities, such as moisture, additive agent, or the like. Thus, the fuel flowing out through the return pipe 28 has a slight electric conductivity. Even in case that there is a tendency for the filter case 2 to be electrified or charged with static electricity owing to friction of the fuel flowing through the filter case 2 and the inner wall of the filter case, the static electricity can be released from the electrified filter case 2, when the superfluous fuel flowing out through the return pipe 28 is returned to the tank 1 while impinging upon the outer periphery of the filter case 2.

As set forth above, in the fuel feeder of the embodiment, the fuel-pressure regulator 17 is installed or located at the upper portion of the filter case 2, and its outlet fitting is connected to the return pipe 28 extending downwards therefrom. Thus, the conduit portion 28B of the return pipe 28 can be extended downwards from the upper portion of the filter case 2 to the middle of the filter case 2. As a result, the return-fuel outlet 28D can be arranged at some distance from the bottom portion 1B of the tank 1. Also, except a particular case that a fuel level of fuel stored in the tank 1 is lowered extremely, the return-fuel outlet 28D can be kept in its soaked state wherein the return-fuel outlet 28D remains soaked in the fuel stored in the tank. In the soaked state, it is possible to gently quietly flow the superfluous fuel to be returned through the pressure regulator 17 into the fuel in the tank 1 via the return pipe 28. This suppresses undesired noises and vibrations from occurring owing to collision of the fuel returned from the regulator 17 to the tank 1 against the fuel-tank bottom portion 1B, and also prevents noises occurring when the fuel returned is battered against the surface of the fuel in the tank 1. Therefore, during operation, the fuel feeder of the embodiment ensures reduced noises and vibrations and enhanced quality. Additionally, in the fuel feeder of the embodiment, the return-fuel outlet 28D is formed as an elongated slot extending vertically along the outer peripheral wall surface of the filter case 2, while facing the outer periphery of the filter case 2. Thus, when the fuel in the tank 1 is little, the fuel flowing out through the return-fuel outlet 28D can be directed towards the outer periphery of the filter case 2. In such a case that the fuel level is very low, the fuel flowing through the pressure regulator 17 is returned to the tank 1, while coming into collision-contact with the outer periphery of the filter case with a comparatively wide contact area. Even when there is a tendency for the filter case 2 to be charged with static electricity, the static electricity produced on the filter case 2 can be effectively released by flowing out the fuel having a slight conductivity through the return pipe 28 towards the outer periphery of the filter case 2. The kinetic energy or power of fuel flowing out through the return pipe 28 can be weakened by virtue of impingement of the outgoing fuel flow against the outer periphery of the filter case 2, and whereby the superfluous fuel can be returned gently and quietly to the tank 1 (toward the tank bottom portion 1B). Furthermore, in the shown embodiment, the seal ring 29 is interleaved between the outlet fitting portion 26 of the pressure regulator 17 and the cylindrical fitted portion 28A of the return pipe 28 to provide tight seal or sealing action. Without any fuel leakage from the fuel return line, the superfluous fuel can be certainly returned from the outlet fitting portion 26 through the return-fuel outlet 28D to the tank. The seal ring 29 also ensures a stable installation of the return pipe 28 onto the lower end of the outlet fitting portion 26. Moreover, the pump supporting bracket 11 is formed with the return-pipe supporting hole portion 12 having a non-circular return-pipe mounting hole 12A, and additionally the tip end of the mounting portion 28C of the return pipe 28 is correspondingly shaped with respect to the non-circular lateral cross section of the return-pipe mounting hole 12A. This prevents relative rotation of the mounting portion 28C of the return pipe 28 within the return-pipe mounting hole 12A. As can be appreciated, the return pipe 28 can be more stably supported at both upper and lower ends (with a comparatively long axial span between the two supporting points), thus permitting the return-fuel outlet 28D to certainly face toward the outer periphery of the filter case 2.

In the shown embodiment, the elongated slot-like return-fuel outlet 28D is formed in the inner periphery of the return pipe 28 to face the outer periphery of the filter case 2 in order for the fuel flowing out through the return-fuel outlet 28D to be brought into collision-contact with the outer periphery of the filter case 2. The return-fuel outlet 28D is not limited to such a unique shape, that is, an elongated slot. In lieu thereof, a plurality of small lateral bores may be formed in the return pipe 28 and aligned with each other in the longitudinal direction of the return pipe. Also, in the shown embodiment, the sub-assembly consisting of the mounting bracket 7, the pump supporting bracket 11 and the filter case 2 is constructed as a three-piece filter casing part, so that the mounting bracket 7 and the pump supporting bracket 11 are both detachably connected to the filter case 2. Alternatively, the mounting bracket 7, the pump supporting bracket 11, and the filter case 2 may be integrally formed with each other as a unit. The pump supporting bracket 11 may be eliminated by changing a way for supporting the pump 10. In this case, the return-pipe supporting hole portion 12 (having the non-circular return-pipe mounting hole 12A) may be constructed as a tab-like return-pipe supporting hole portion formed integral with and extending outwardly radially from the lower portion of the filter case.

The entire contents of Japanese Patent Application No. P10-309448 (filed Oct. 15, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fuel feeder comprising:
    a filter case including an inner tubular portion and an outer tubular portion, defining a fuel-filter accommodating space between an outer peripheral wall of the inner tubular portion and an inner peripheral wall of the outer tubular portion, and defining a fuel pump accommodating space in an inner peripheral wall of the inner tubular portion;
    an in-tank fuel pump adapted to be located in a fuel tank by accommodating said in-tank fuel pump in the pump accommodating space of said filter case, and discharging fuel in the fuel tank into the fuel-filter accommodating space;
    a filter element accommodated in the fuel-filter accommodating space to remove dirt and other contaminants from the fuel discharged from said in-tank fuel pump and passing through said filter element;
    a pressure regulator installed on said filter case and having a fuel return port to return superfluous fuel to the fuel tank if a fuel pressure in the fuel-filter accommodating space exceeds a predetermined pressure level;
    said pressure regulator located at an upper side of said filter case;
    a fuel return pipe connected at one end to the fuel return port of said pressure regulator, and having a conduit portion extending downwards from the one end along the outer peripheral wall of the outer tubular portion of said filter case, and
    said fuel return pipe having a return-fuel outlet formed along a side of the conduit portion facing the outer peripheral wall of the outer tubular portion of said filter case, so that excess fuel flow is directed toward and against the outer peripheral wall of the outer tubular portion of said filter case to cause the excess fuel to flow over the outer peripheral wall of the outer tubular portion of said filter case in a manner which attenuates vibration noise and static charge.

2. The fuel feeder as claimed in claim 1, which further comprises a seal ring interleaved between an outer periphery of the fuel return port of said pressure regulator and an inner periphery of the one end of the fuel return pipe, so that the one end of the fuel return pipe is fitted onto the outer periphery of the fuel return port in a fluid-tight fashion.

3. The fuel feeder as claimed in claim 1, which further comprising a pump supporting bracket attached to a bottom side of said filter case for supporting said in-tank fuel pump from the underside of said in-tank fuel pump, and wherein the pump supporting bracket has a mounting hole into which a tip end of the conduit portion is fitted.

4. A fuel feeder comprising:
    a filter case including an inner tubular portion and an outer tubular portion, defining a fuel-filter accommodating space between an outer peripheral wall of the inner tubular portion and an inner peripheral wall of the outer tubular portion, and defining a fuel pump accommodating space in an inner peripheral wall of the inner tubular portion;
    an in-tank fuel pump adapted to be located in a fuel tank by accommodating said in-tank fuel pump in the pump accommodating space of said filter case, and discharging fuel in the fuel tank into the fuel-filter accommodating space;
    a filter element accommodated in the fuel-filter accommodating space to remove dirt and other contaminants from the fuel discharged from said in-tank fuel pump and passing through said filter element;
    a pressure regulator installed on said filter case and having a fuel return port to return superfluous fuel to the fuel tank if a fuel pressure in the fuel-filter accommodating space exceeds a predetermined pressure level;
    said pressure regulator located at an upper side of said filter case; and
    a fuel return pipe connected to the fuel return port of said pressure regulator for returning the superfluous fuel to the fuel tank; said fuel return pipe comprising:
        (a) a fitted portion which is fitted onto a downstream end of the fuel return port of said pressure regulator,
        (b) a conduit portion extending downwards from the fitted portion along the outer peripheral wall of the outer tubular portion of said filter case,
        (c) a return-fuel outlet formed in a side of the conduit portion facing the outer peripheral wall of the outer tubular portion of said filter case and located at a position upwardly spaced apart from a bottom portion of the fuel tank, and
        (d) a curved wall surface portion formed in a lowermost end of the conduit portion so that the curved wall surface is curved in a direction of the outer peripheral wall of the outer tubular portion of said filter case and formed into a substantially concave, spherical surface, whereby the curved wall surface cooperates with the return-fuel outlet so that superfluous fuel flow is directed toward the outer peripheral wall of the outer tubular portion of said filter case to cause impingement of the superfluous fuel low against the outer peripheral wall of the outer tubular portion of said filter case.

5. The fuel feeder as claimed in claim 4, wherein the return-fuel outlet is formed as an elongated slot extending in a longitudinal direction of the conduit portion between a middle and a downstream end of the conduit portion and facing the outer peripheral wall of the outer tubular portion of said filter case.

6. A fuel feeder comprising:
   a filter case comprising first, second, and third filter case elements integrally connected to each other, said first filter case element forming a main body of said filter case and including an inner tubular portion and an outer tubular portion., defining a fuel-filter accommodating space between an outer peripheral wall of the inner tubular portion and an inner peripheral wall of the outer tubular portion, and defining a fuel pump accommodating space in an inner peripheral wall of the inner tubular portion, said second filter case element including a mounting bracket having a flat-plate portion located in a fuel-tank access hole and detachable from said first filter case element, and said third filter case element including a pump supporting bracket having a bottom portion covering a bottom opening of said filter case and side wall portions fitted onto the outer peripheral wall of the outer tubular portion of said first filter case element and detachable from said first filter case element, and said pump supporting bracket having a mounting hole;
   an in-tank fuel pump adapted to be located in a fuel tank by accommodating said in-tank fuel pump in the pump accommodating space of said first filter case element, and discharging fuel in the fuel tank into the fuel-filter accommodating space;
   a filter element accommodated in the fuel-filter accommodating space to remove dirt and other contaminants from the fuel discharged from said in-tank fuel pump and passing through said filter element;
   a pressure regulator installed on said first filter case element and having a fuel return port to return superfluous fuel to the fuel tank if a fuel pressure in the fuel-filter accommodating space exceeds a predetermined pressure level;
   said pressure regulator located at an upper side of said first filter case element; and
   a fuel return pipe connected to the fuel return port of said pressure regulator for returning the superfluous fuel to the fuel tank; said fuel return pipe comprising:
   (a) a fitted portion which is fitted onto a downstream end of the fuel return port of said pressure regulator,
   (b) a conduit portion extending downwards from the fitted portion along the outer peripheral wall of the outer tubular portion of said first filter case element,
   (c) a return-fuel outlet formed in a side of the conduit portion facing the outer peripheral wall of the outer tubular portion of said first filter case element and located at a position upwardly spaced apart from a bottom portion of the fuel tank,
   (d) a curved wall surface portion formed in a lowermost end of the conduit portion so that the curved wall surface is curved in a direction of the outer peripheral wall of the outer tubular portion of said first filter case element and formed into a substantially concave, spherical surface, whereby the curved wall surface cooperates with the return-fuel outlet so that superfluous fuel flow is directed toward the outer peripheral wall of the outer tubular portion of said first filter case element to cause impingement of the superfluous fuel flow against the outer peripheral wall of the outer tubular portion of said first filter case element, and
   (e) a bar-like mounting portion extending downwards from the lowermost end of the conduit portion and having a tip end portion which is fitted into the mounting hole of said pump supporting bracket.

* * * * *